(12) United States Patent
Chelgren (10) Patent No.: US 7,032,917 B1
(45) Date of Patent: Apr. 25, 2006

(54) REAR SUSPENSION FOR WHEELCHAIR

(76) Inventor: Eric Mark Chelgren, 500 E. Sixth St., Vinton, IA (US) 52349

( * ) Notice: Subject to any disclaimer, the term of this patent is extended or adjusted under 35 U.S.C. 154(b) by 0 days.

(21) Appl. No.: 10/664,242

(22) Filed: Sep. 17, 2003

Related U.S. Application Data (60) Provisional application No. 60/412,073, filed on Sep. 19, 2002.

(51) Int. Cl.
*A61G 5/10* (2006.01)
(52) U.S. Cl. .............................. 280/304.1; 280/250.1; 280/283; 297/DIG. 4
(58) Field of Classification Search ............ 280/250.1, 280/304.1, 283, 284; 297/DIG. 4; 180/907
See application file for complete search history.

(56) References Cited

U.S. PATENT DOCUMENTS

| | | | | |
|---|---|---|---|---|
| 2,895,742 A | * | 7/1959 | Johnson | 280/47.41 |
| 4,078,817 A | * | 3/1978 | Ferguson et al. | 280/250.1 |
| 4,455,031 A | * | 6/1984 | Hosaka | 280/250.1 |
| 4,861,056 A | * | 8/1989 | Duffy et al. | 280/250.1 |
| 5,727,802 A | * | 3/1998 | Garven et al. | 280/250.1 |
| 5,851,019 A | * | 12/1998 | Gill et al. | 280/250.1 |
| 6,131,679 A | * | 10/2000 | Pulver et al. | 180/65.1 |
| 6,161,856 A | * | 12/2000 | Peterson | 280/250.1 |
| 6,425,597 B1 | * | 7/2002 | Peterson | 280/250.1 |

* cited by examiner

*Primary Examiner*—Lesley D. Morris
*Assistant Examiner*—Matthew Luby
(74) *Attorney, Agent, or Firm*—Allan L. Harms

(57) ABSTRACT

A shock absorbing suspension for the large rear wheels of a wheelchair is disclosed. A fork element is hinged at one end to a clamping member which attaches to a horizontal frame member of the wheelchair. A cylindrical solid polymer shock absorber cushions the movement of the fork element toward the clamping member. The free end of the fork element includes an axleway for the axle of a large wheelchair wheel. The movement of the fork element relative to the clamping member is limited by abutting surfaces on the fork element and the clamping member.

5 Claims, 6 Drawing Sheets

REAR SUSPENSION FOR WHEELCHAIR

CROSS-REFERENCE TO RELATED APPLICATIONS

This application claims priority from copending provisional patent application entitled "Rear Suspension for Wheelchair", Ser. No. 60/412,073 filed Sep. 19, 2002. The disclosure of provisional patent application Ser. No. 60/412,073 is hereby incorporated in its entirety.

STATEMENT REGARDING FEDERALLY SPONSORED RESEARCH OR DEVELOPMENT

Not Applicable.

BACKGROUND OF THE INVENTION

The present invention pertains to wheelchairs and particularly to suspension of the large rear wheels of wheelchairs which are manually operable as well as those that are powered by self-contained motors.

In the typical manual wheelchair each rear wheel is a large wheel mounted to the frame of the wheelchair without any provision for absorption of shocks or damping of vibration of the wheelchair. In such a wheelchair, shocks and vibrations arising from irregularities and defects in the traveled surface are transmitted through the rear wheels to the wheelchair occupant. One attempt to reduce this phenomenon is shown in U.S. Pat. No. 4,455,031 wherein a shock absorber interconnects the seat of the wheelchair with a frame on which the large rear wheels are mounted. The present invention provides simplified shock absorbing apparatus for each large rear wheel to reduce the shock and vibration felt by the user of a wheelchair traversing a surface.

SUMMARY

The present invention provides a rear suspension for a wheelchair which can be retrofitted to a wheelchair or installed at initial manufacture. The invention is directed toward a manually operated wheelchair, especially a sport wheelchair, which is driven by the rider pushing the large rear wheels by hand. However the invention is equally applicable to a powered wheelchair.

Each rear suspension element is mounted to a horizontal side bar of the wheelchair frame such that the hub of each back wheel is located slightly below the horizontal side bar to which the suspension element is mounted. Each rear suspension element includes the clamp for mounting the suspension element to the horizontal side bar of the wheelchair frame, the clamp having a base and an upper member which cooperate to surround the side bar. A fork element is hinged to the base of the clamp at one end of the base. The fork includes an axle housing to receive the axle of the rear wheel it suspends. The fork extends rearward along the horizontal side bar below the base of the clamp. An upright polymer cylinder is trapped between the bottom of the base of the clamp and the fork to provide a shock absorber. Rotation of the fork relative to the hinge is limited by surfaces on the fork and on the base near the hinge such that the fork cannot rotate away from the clamp base to the extent that the polymer cylinder will fall out of place. Similarly other abuttable surfaces prevent the fork from rotating toward the clamp base to an extent which might cause excessive compression of the polymer cylinder.

The fork includes a large axle housing to receive the axle of the large wheel. The fork has two separated tines which are joined at their lower edges by a transverse wall which carries a recess which receives the lower end of the polymer cylinder. Each tine terminates with a ring which, with the ring of the other tine, forms the large axle housing. Each ring contains a small gap in its circumference and the distal parts of the lower edges of the rings are joined by a web. The web may be drawn toward the transverse wall of the fork by a screw which can be adjusted, making the large axle housing adjustable in circumference so that the axle of the large rear wheel can be held securely within the axle housing of the fork.

The bottom of the clamp base includes a stub having a cylindrical hollow which can receive the upper end of the polymer cylinder to retain it. The hinge and fork are arranged slightly off center below the clamp so that movement of the suspension element is not interfered with by the frame of wheelchair.

It is an object of the invention to provide a shock absorbing apparatus to reduce the transmission of bumps and shocks from the large rear wheels of a wheelchair to the rider in the wheelchair.

It is a further object of the invention to provide an improved manual wheelchair which is less uncomfortable for the user to ride over irregular surfaces.

It is also an object of the invention to provide a shock absorbing rear suspension which can be easily added to an existing wheelchair.

These and other objects will become apparent from examination of the description which follows.

DETAILED DESCRIPTION OF THE INVENTION

Figure 1:
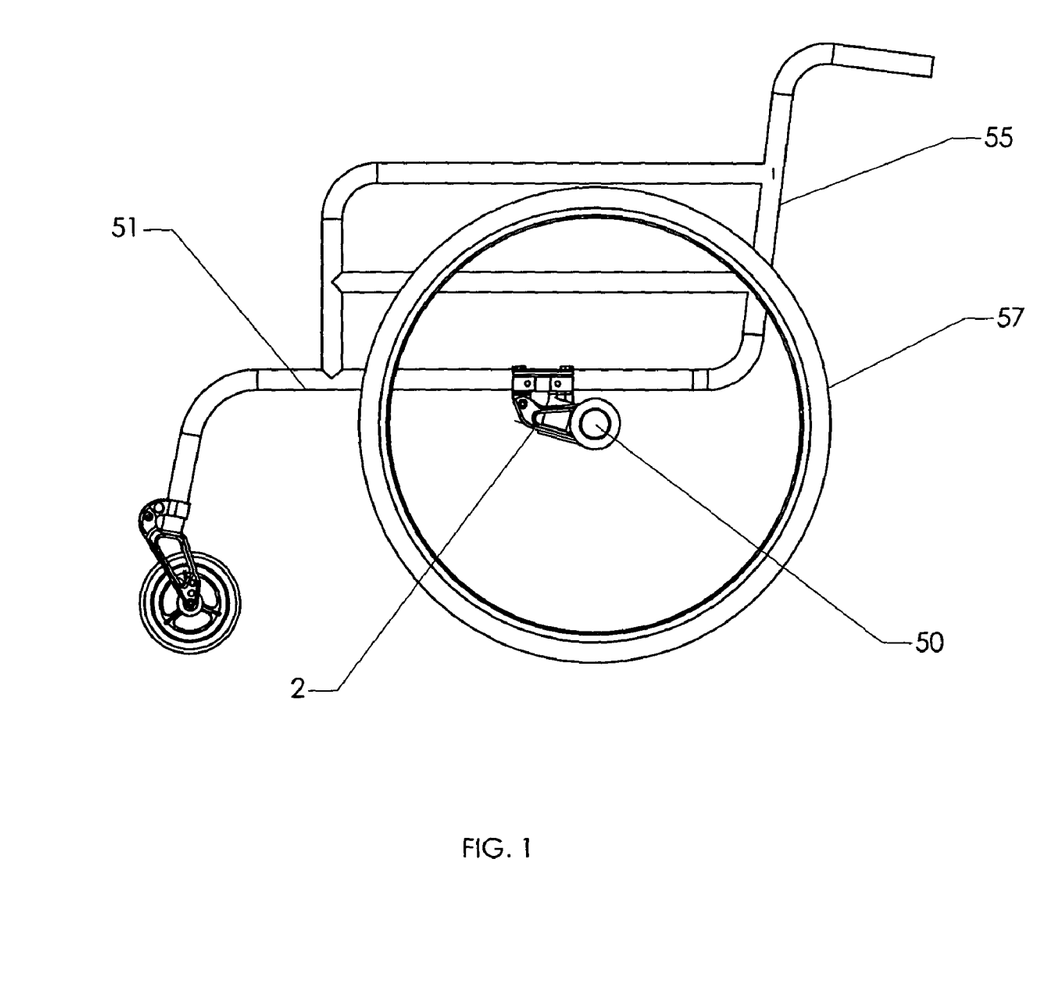
FIG. 1 is a front elevation of a wheelchair equipped with the invention.

FIG. 1 discloses a wheelchair 55 equipped at each rear wheel 57 thereof with a rear suspension element 2 according to the present invention. A horizontal frame member 51 on each side of the wheelchair 55 has one of rear suspension elements 2 clamped thereto. Each rear wheel 57 is mounted at its axle 50 to a rear suspension element 2.

Figure 2:
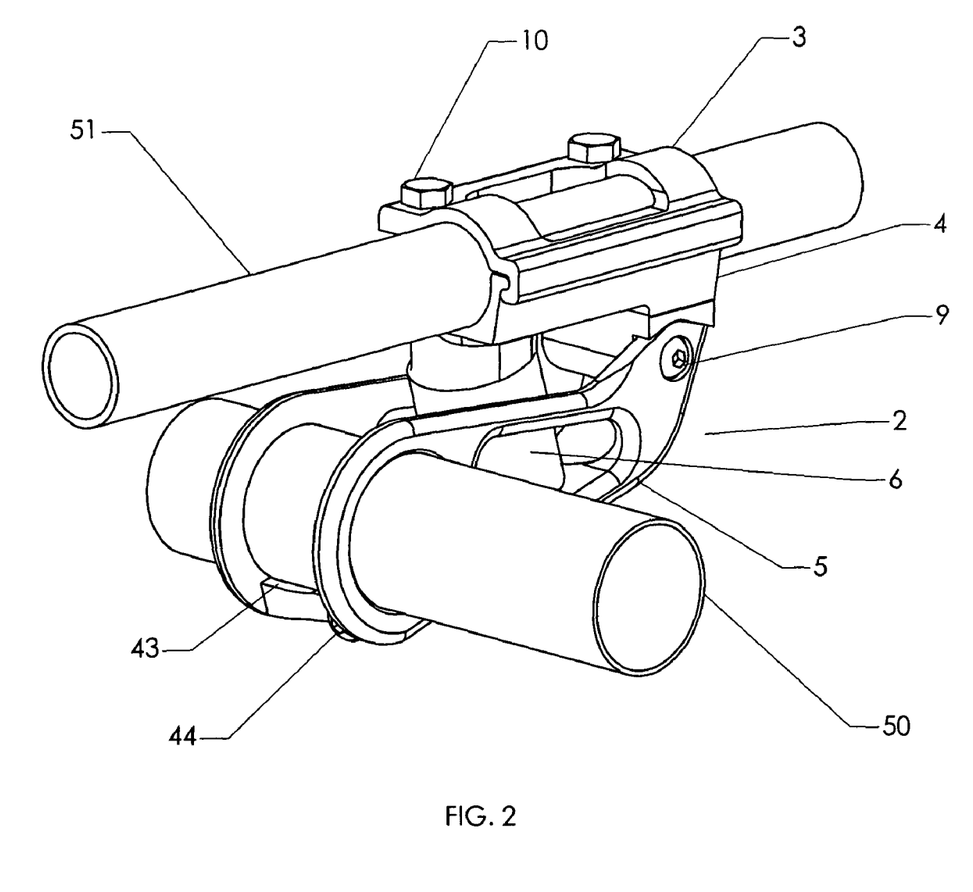
FIG. 2 is a perspective of the invention mounted to the frame of a wheelchair and supporting the axle of the rear wheel of a wheelchair, the frame being cut away.
Figure 3:
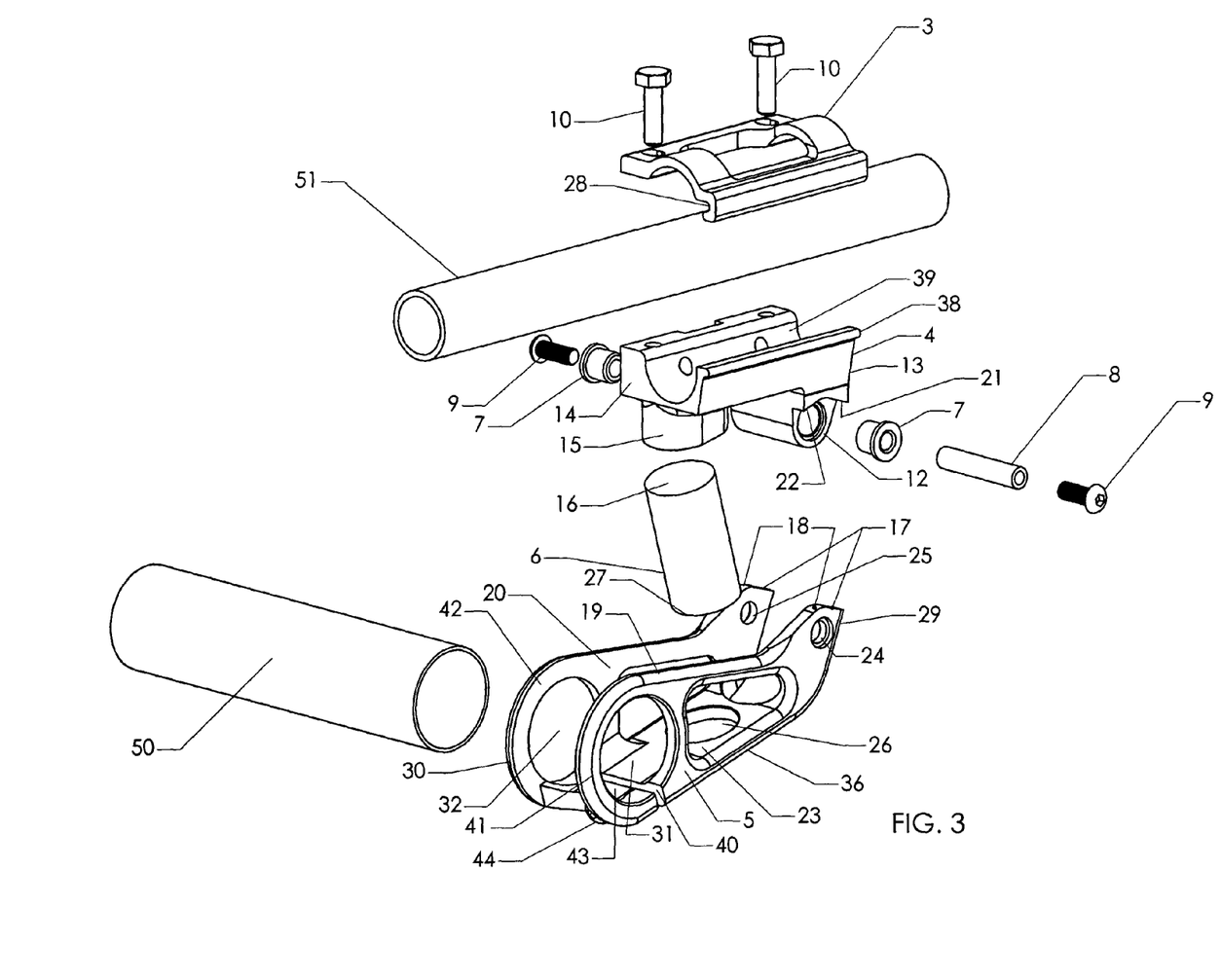
FIG. 3 is an exploded perspective of the invention of FIG. 1.

FIG. 2 shows a perspective of the invention rear suspension element 2 suspending rear wheel axle 50 (with the rear wheel removed) of a manual wheelchair. The invention is shown mounted to a horizontal frame member 51 (cut away) of the manual wheelchair.

Referring now to FIGS. 2–5, the invention comprises a clamp base 4 which may be secured to horizontal frame member 51 of the wheelchair by use of enclosing member 3 which may be securely fastened to clamp base 4 by use of bolts 10. Enclosing member 3 includes longitudinal notch 28 into which elongate ridge 38 of clamp base 4 is received before bolts 10 are installed. Clamp base 4 and enclosing member 3 cooperate to surround tubular frame member 51 and retain the invention to horizontal frame member 51. As is readily understood, clamp base 4 and enclosing member 3 may be fixed to a frame member of many different wheelchairs and such wheelchairs can be easily retrofitted with the rear suspension elements 2.

Clamp base 4 includes an axle housing 12 mounted therebelow at one longitudinal end 13 thereof. Near opposing end 14 of clamp base 4 is formed a vertically oriented receiver 15 which includes a hollow which receives upper end 16 of polymer shock absorber 6. Polymer shock absorber 6 is retained between clamp base 4 and fork 5 and comprises an elongate solid cylinder of compressible polymeric material which is uniform in construction. Shock absorber 6 is constructed to be robust in resisting longitudinal compression and may be one to three inches long and about one inch in diameter. Polymer shock absorber 6 may be formed of VIBRATHANE™ polyurethane supplied by Uniroyal Co. or of many other resilient polymer compounds which can absorb longitudinal compressive forces of approximately three hundred fifty pounds.

Fork 5 comprises a pair of parallel spaced apart tines 19, 20 which are joined at the lower edges 36 by transverse wall 23. Each tine 19, 20 includes pivot pin openings 24, 25 respectively at pivot end 29 of fork 5. Transverse wall 23 includes seat 26 which receives the lower end 27 of shock absorber 6. Seat 26 comprises a cylindrical recess in transverse wall 23. Free end 30 of fork 5 is provided with wheel axle openings 31, 32 on tines 19, 20 respectively into which the axle 50 of the rear wheel of the wheelchair is to be received. With shock absorber 6 uncompressed, fork 5 rests at about twenty-two degrees of angular separation from the longitudinal axis of clamp base 4.

Fork 5 is retained to clamp base 4 by pivot pin 8 which passes through pivot pin openings 24, 25 and is received in pivot bushings 7 which are received in opposing ends of axle housing 12. Pivot pin 8 is retained in bushings 7 and within axle housing 12 by cap screws 9 mounted at opposing ends of pivot pin 8. Fork 5 is pivotable about pivot pin 8 over a limited range permitted by adjoining stop faces 17, 18 on each of tines 19, 20 respectively of fork 5. First stop faces 17 are joined to second stop faces 18 at an obtuse angle of at least about one hundred thirty degrees. Axle housing 12 is provided with third and fourth stop faces 21, 22 (see FIG. 4) on opposing ends thereof. Third stop faces 21 join fourth stop faces 22 at an angle exceeding the angle separating first and second stop faces 17, 18 by at least approximately ten degrees. Third stop faces 21 abut first stop faces 17 of tines 19, 20 when shock absorber 6 is decompressed and limit the downward rotation of fork 5 about pivot pin 8. Conversely, when fork 5 is forced upward by a road surface feature, compression of shock absorber 6 is limited when second stop faces 18 limit rotation of fork 5 about pivot pin 8 by their abutment on fourth stop faces 22.

Fork 5 may include voids 33 in each of tines 19, 20 to reduce weight. Voids 33 also allow access to the polymer shock absorber for its positioning within seat 26.

Fork 5 is formed of rigid metal or polymeric materials and is cast or formed such that tines 19, 20 and transverse wall 23 are integral and of uniform composition, it being anticipated that fork 5 will be formed as a one-piece unit. Fork 5 is provided with a generally linear lower edge 36 and each of tines 19, 20 has an upper edge 37 which is generally linear before sloping upward to join second stop face 18. Lower edge 36 slopes upward at approximately forty-five degrees near pivot end 29 of fork 5.

Figure 4:
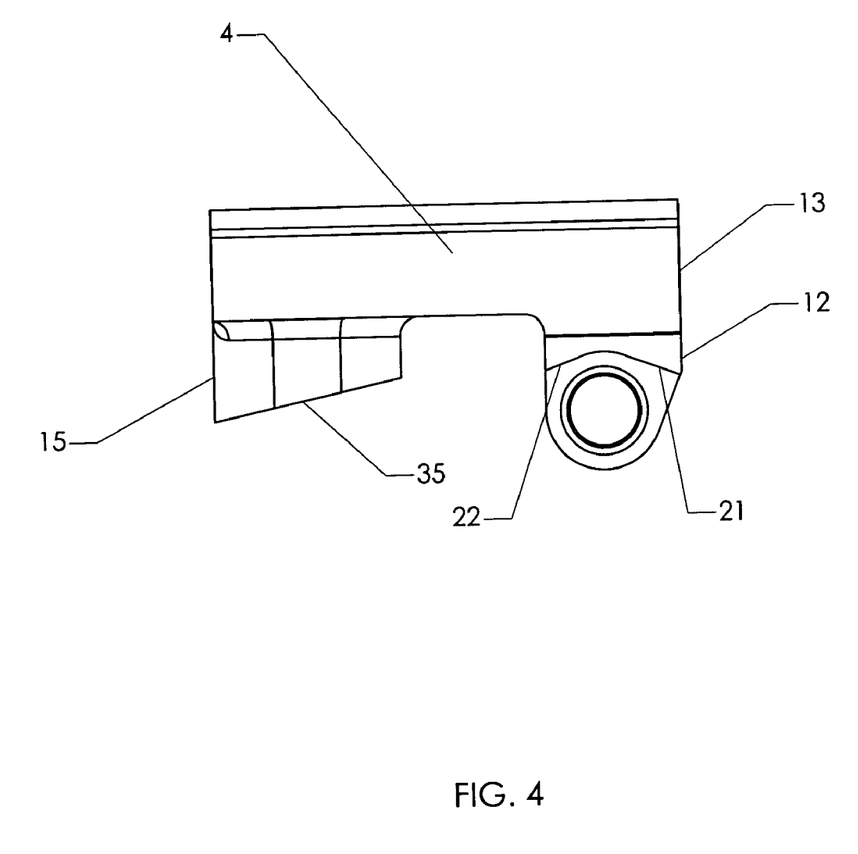
FIG. 4 is an enlarged front elevation of the base member of the invention.

As may be best seen in FIG. 4, receiver 15 is slanted at its lower end 35 to facilitate placement of upper end 16 of polymer shock absorber 6 therein such that the longitudinal axis of polymer shock absorber 6 rests at essentially a perpendicular to transverse wall 23. Therefore, the longitudinal axis of polymer shock absorber 6 is not aligned with the longitudinal axis of receiver 15 when shock absorber 6 is decompressed. Receiver 15 is a hollow sleeve which receives the upper end 16 of polymer shock absorber 6.

Figure 5:
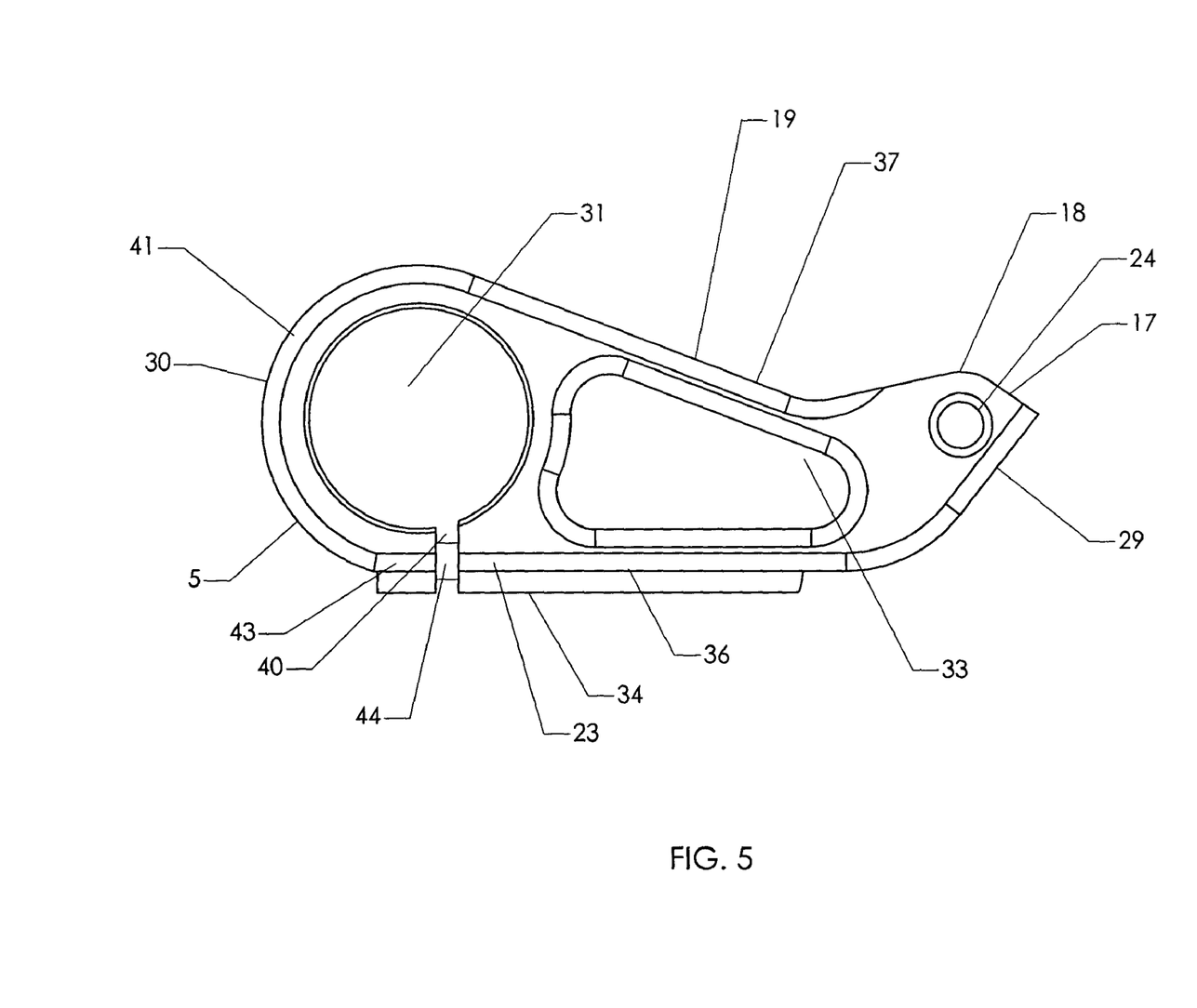
FIG. 5 is an enlarged front elevation of the fork member of the invention.

Each of wheel axle openings 31, 32 is defined by a ring 41, 42 of tines 19, 20 respectively and each of rings 41, 42 comprises a gap 40 in its lower region. Provision of gaps 40 allows rings 41, 42 to be adjustable in circumference so that they can be tightened around wheel axles 50 of the large rear wheels of the wheelchair. A web 43 joins the distal lower portions of rings 41, 42. Web 43 may be drawn toward transverse wall 23 to reduce or increase gaps 40 by use of a screw 44 extending through web 43 and threaded into transverse wall 23. Rib 34 may be integrally formed on the underside of transverse wall 23 to provide structure to receive screw 44.

In order to avoid interference of the rear wheels with frame components of the wheelchair 55 upon which rear suspension element 2 is mounted, it is preferable that fork 5 be offset from the axis of the frame member 51 such that fork 5 may pivot about pivot pin 8 without striking or rubbing any part of wheelchair 55. Hence the longitudinal axis of fork 5 is spaced apart laterally approximately ¼ inch from the axis of cylindrical recess 39 of clamp base 4 when suspension element 2 is oriented vertically, as would be the normal orientation when mounted to a wheelchair. When the rear suspension element 2 is mounted to a wheelchair, the preferred orientation of the rear suspension element 2 is such that the pivot end 29 of fork 5 is forward of the free end 30 of the fork 5.

Figure 6:
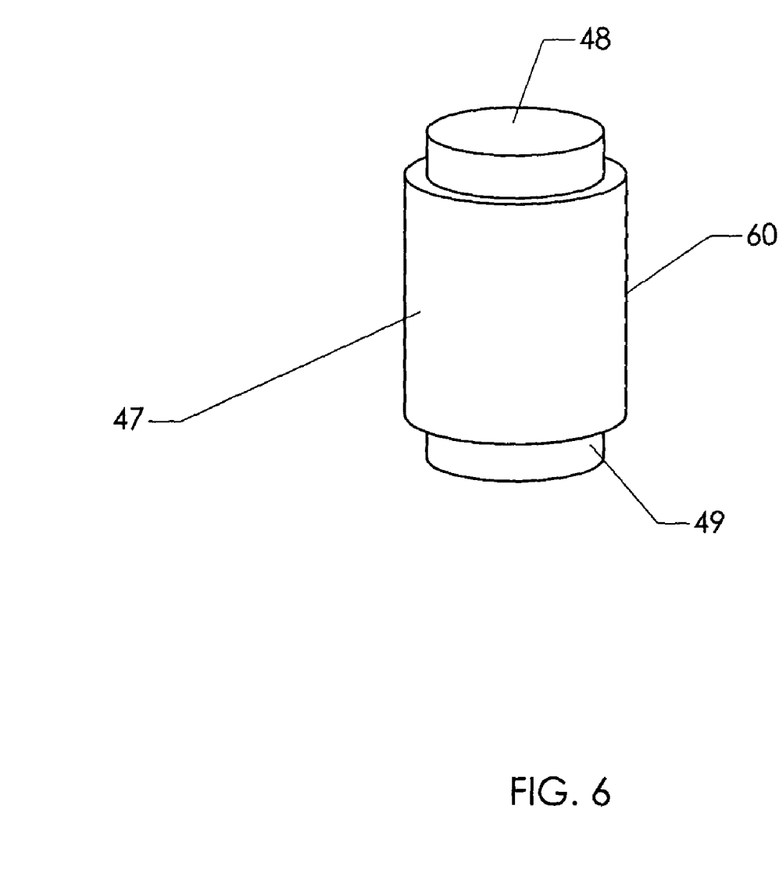
FIG. 6 is a front perspective of an alternative embodiment of the polymer shock absorber of the invention.

An alternative embodiment polymer shock absorber 60 is illustrated in FIG. 6. In this embodiment, body 47 of shock absorber 60 is of enlarged cross section while stubs 48 and 49 are of smaller cross section and upper stub 48 will fit within the hollow of receiver 15 and lower stub 49 will fit within seat 26 of transverse wall 23. Shock absorber 60 may be utilized in place of polymer shock absorber 6 when a heavier person will be the user of the wheelchair on which the rear suspension elements 2 are mounted.

It can be seen that shock absorber 6 or alternate shock absorber 60 are disposed generally vertically within rear suspension element 2 and serve to dampen vertical movement of the fork 5 to reduce the jarring of the wheelchair occupant as the large wheels 57 pass over irregularities of the street or floor on which the wheelchair 55 is operated.

Many variations will be apparent to those skilled in the art. It is therefore to be understood, that within the scope of the appended claims, the invention may be practiced other than as specifically described.

I claim:

1. Suspension apparatus for a rear wheel of a wheelchair comprising
   a mounting member rigidly mounted to frame member of the wheelchair,
   an elongate fork member hingedly mounted to the mounting member,
   the fork member including a hinge end and a free end,
   a rear wheel axle receiving opening at the free end of the fork member, a shock absorber disposed between the fork member and the mounting member, the shock absorber damping vertical movement of the fork member, pivot limiting means is provided for restricting movement of the free end of the fork member.

2. Suspension apparatus for a rear wheel of a wheelchair comprising a mounting member rigidly mounted to a frame member of the wheelchair, an elongate fork member hingedly mounted to the mounting member, the fork member including a hinge end and a free end, a rear wheel axle having opening at the free end of the fork member, a shock absorber disposed between the fork member and the mounting member, the shock absorber damping vertical movement of the fork member, the shock absorber comprises an elongate cylinder of solid polymeric material, the mounting member is detachably mountable to a horizontal frame member of the wheelchair, the elongate fork member hingedly mounted to the mounting member at a first end thereof, the mounting member comprising a base member and an upper member, the upper member attachable to the base member, the base member and the upper member cooperative to surround a length of the horizontal frame member of the wheelchair, the shock absorber comprising an upper end and a lower end, the fork member including a seat for receiving the lower end of the shock absorber, the base member having a receiver for receiving the upper end of the shock absorber, a first surface on the fork member abuts a first surface on the mounting member when the shock absorber is fully decompressed.

3. The suspension apparatus of claim 2 wherein a second surface is disposed on the fork member which abuts a second surface on the mounting member to limit longitudinal compression of the shock absorber.

4. Suspension apparatus for a rear wheel of a wheelchair comprising a mounting member rigidly mounted to a frame member of the wheelchair, an elongate fork member hingedly mounted to the mounting member, the fork member including a hinge end and a free end, a rear wheel axle receiving opening at the free end of the fork member, a shock absorber disposed between the fork member and the mounting member, the shock absorber damping vertical movement of the fork member, the shock absorber comprises an elongate cylinder of solid polymeric material, the fork member includes a pair of parallel tines joined at lower edges thereof by a transverse wall, each tine of the fork member having a pivot end and a free end, the free end of each tine including a rear wheel axle opening for receiving an axle of the rear wheel of the wheelchair, the pivot end of each tine including a pivot pin opening, the mounting member comprising a base and an upper clamp, the base comprises a flat end and an opposed second end, a pivot pin horizontally disposed on the base below the first end thereof, the base including a vertically disposed hollow mounted therebelow, the hollow spaced away from the first end of the base, the shock absorber having upper and lower ends, the upper end of the shock absorber received in the hollow of the base member, the lower end of the shock absorber received in a seat on the transverse wall of the fork member, the seat comprising a recess sized to receive the lower end of the shock absorber, each tine having first and second stop faces, the base member having adjoining first and second abutment faces adjacent opposing ends of the pivot pin, the first faces of each tine abuttable with the first faces of the base, the second faces of each tine abuttable with the second faces of the base, the first face of each tine joined to the second face thereof at an obtuse angle, each first face of the base joined to one of the second faces of the base at an obtuse angle, the angle between the first base on each tine and the second face thereof greater than the angle between each first face and each second face of the base.

5. Suspension apparatus for a rear wheel of a wheelchair comprising a mounting member mounted to a frame member of the wheelchair, an elongate fork member hingedly mounted to the mounting member, the fork member including a hinge end and a free end, a rear wheel axle receiving opening at the free end of the fork member, a shock absorber disposed between the fork member and the mounting member, the shock absorber damping vertical movement of the fork member, the shock absorber comprising an elongate cylinder of solid polymeric material, the fork member including a pair of parallel tines joined at lower edges thereof by a transverse wall, each tine of the fork member having a pivot end and a free end, the free end of each tine including a rear wheel axle opening for receiving an axle of the rear wheel of the wheelchair, the pivot end of each tine including a pivot pin opening, the mounting member comprising a base and an upper clamp, the base comprises a first end and an opposed second end, a pivot pin horizontally disposed on the base below the first end thereof, the base including a vertically disposed hollow mounted therebelow, the hollow spaced away from the first end of the base, the shock absorber having upper and lower ends, the upper end of the shock absorber received in the hollow of the base member, the lower end of the shock absorber received in a seat on the transverse wall of the fork member, the seat comprising a recess sized to receive the lower end of the shock absorber, each tine having first and second stop faces, the base member having adjoining first and second abutment faces adjacent opposing ends of the pivot pin, the first faces of each tine abuttable with the first faces of the base, the second faces of each tine abuttable with the second faces of the base, the first face of each tine joined to the second face thereof at an obtuse angle, each first face of the base joined to one of the second faces of the base at an obtuse angle, the angle between the first face on each tine and the second face thereof greater than the angle between each first face and each second face of the base.

* * * * *